(12) United States Patent
Lukehart

(10) Patent No.: US 6,374,879 B1
(45) Date of Patent: Apr. 23, 2002

(54) CARPENTRY COPING MACHINE

(76) Inventor: Brett Lukehart, 513 River Oaks Dr., New Orleans, LA (US) 70131

( * ) Notice: Subject to any disclaimer, the term of this patent is extended or adjusted under 35 U.S.C. 154(b) by 0 days.

(21) Appl. No.: 09/699,333

(22) Filed: Oct. 31, 2000

Related U.S. Application Data

(60) Provisional application No. 60/171,653, filed on Dec. 27, 1999.

(51) Int. Cl.$^7$ .................................................. B27C 5/00
(52) U.S. Cl. .................. 144/134.1; 144/2.1; 144/136.1; 144/242.1; 269/58; 409/226; 409/227
(58) Field of Search ................................. 83/477, 477.2; 144/2.1, 134.1, 136.1, 137, 242.1, 245.1; 269/56, 58, 59; 248/637, 669; 409/145, 147, 163, 225–228

(56) References Cited

U.S. PATENT DOCUMENTS

| | | |
|---|---|---|
| 2,370,032 A | 2/1945 | Groen |
| 2,436,423 A * | 2/1948 | Dowd et al. ................. 409/226 |
| 2,659,278 A * | 11/1953 | Schultz ........................ 409/226 |
| 3,942,566 A | 3/1976 | Schmidt |
| 4,085,508 A | 4/1978 | Gyongyosi |
| 4,249,446 A | 2/1981 | Tallerico, Jr. |
| 4,353,399 A | 10/1982 | Harris |
| 4,593,735 A | 6/1986 | Wirth, Jr. |
| 4,878,524 A | 11/1989 | Rosenthal et al. |
| 5,036,895 A | 8/1991 | Lue |
| 5,094,279 A | 3/1992 | Dickey et al. |
| 5,340,247 A | 8/1994 | Cuneo et al. |
| 5,667,001 A | 9/1997 | Sanger et al. |
| 5,778,951 A | 7/1998 | Huitsing |

FOREIGN PATENT DOCUMENTS

AU    231969    4/1959

* cited by examiner

*Primary Examiner*—W Donald Bray
(74) *Attorney, Agent, or Firm*—Richard C. Litman

(57) ABSTRACT

A coping machine for making miter cuts on baseboard or crown molding stock includes a work platform supported on vertically movable spring assemblies. Stock to be cut is positioned on the work platform. A rotating cutting knife is disposed adjacent a rear edge of the work platform. Operation of a single lever mechanism functions to move the platform in a downward vertical direction so that the stock may be cut by the rotating cutting knife. The spring assemblies automatically return the platform to its original position when the single lever is released.

20 Claims, 6 Drawing Sheets

US 6,374,879 B1

CARPENTRY COPING MACHINE

CROSS-REFERENCE TO RELATED APPLICATION

This application claims the benefit of U.S. Provisional Patent Application Ser. No. 60/171,653, filed Dec. 27, 1999.

BACKGROUND OF THE INVENTION

1. Field of the Invention

The present invention generally relates to woodworking machines. More specifically, the present invention is drawn to a machine which performs a coping cut on the end of baseboard or crown molding stock.

2. Description of Related Art

Coping is the term used to describe a secondary cut performed on a strip of baseboard or crown molding so that the strip may be mated with a similarly cut strip in a corner.

Heretofore, a miter saw has generally been used to accomplish the coping cut. This is a slow, difficult, hand-performed process that an experienced worker would need at least two minutes to align and cut a single strip by hand.

There have been many devices proposed to efficiently cut molding strips. Examples of such devices are disclosed in U.S. Pat. Nos. 4,249,446 (Tallerico, Jr.), 5,094,279 (Dickey et al.), 5,667,001 (Sanger et al.), and 5,778,951 (Huitsing).

Machines which shape work pieces according to a template configuration are shown in U.S. Pat. Nos. 2,370,032 (Groen), 3,942,566 (Schmidt), 4,085,508 (Gyongyosi), and 5,036,895 (Lue).

U.S. Pat. Nos. 4,353,399 (Harris), 4,593,735 (Wirth, Jr.), 4,878,524 (Rosenthal et al.), 5,340,247 (Cuneo et al.) and Australian Patent number 231,969 show multiple station woodworking apparatus.

None of the above inventions and patents, taken either singly or in combination, is seen to disclose a time-saving, durable, accurate, easy-to-operate coping machine as will subsequently be described and claimed in the instant invention.

SUMMARY OF THE INVENTION

The coping machine of the instant invention offers a truly versatile replacement for the hand coping saw and is designed for fast, on-the-job, production cutting of all types of coped miters.

The coping machine employs an adjustable fence which will accommodate stock sizes from one and one-half to five and one-half inches. Cutter blades are easily accessible and may be replaced to facilitate the cutting of any molding profile. Manipulation of a single lever is all that is required to perform a near-perfect coping cut. The machine is only limited by the rate in which stock can be fed.

As contemplated, the machine is of simplistic design with a minimum number of moving parts. The present invention is portable and requires a minimum set up time, usually less than ten minutes.

Accordingly, it is a principal object of the invention to provide a machine for performing coping cuts on baseboard and crown moldings.

It is another object of the invention to provide a machine for performing coping cuts, which machine is fast, efficient, and easy to operate.

It is a further object of the invention to provide a machine for performing coping cuts, which machine requires manipulation of a single lever to initiate the coping cut.

Still another object of the invention is to provide a machine for performing coping cuts, which machine is easily portable.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
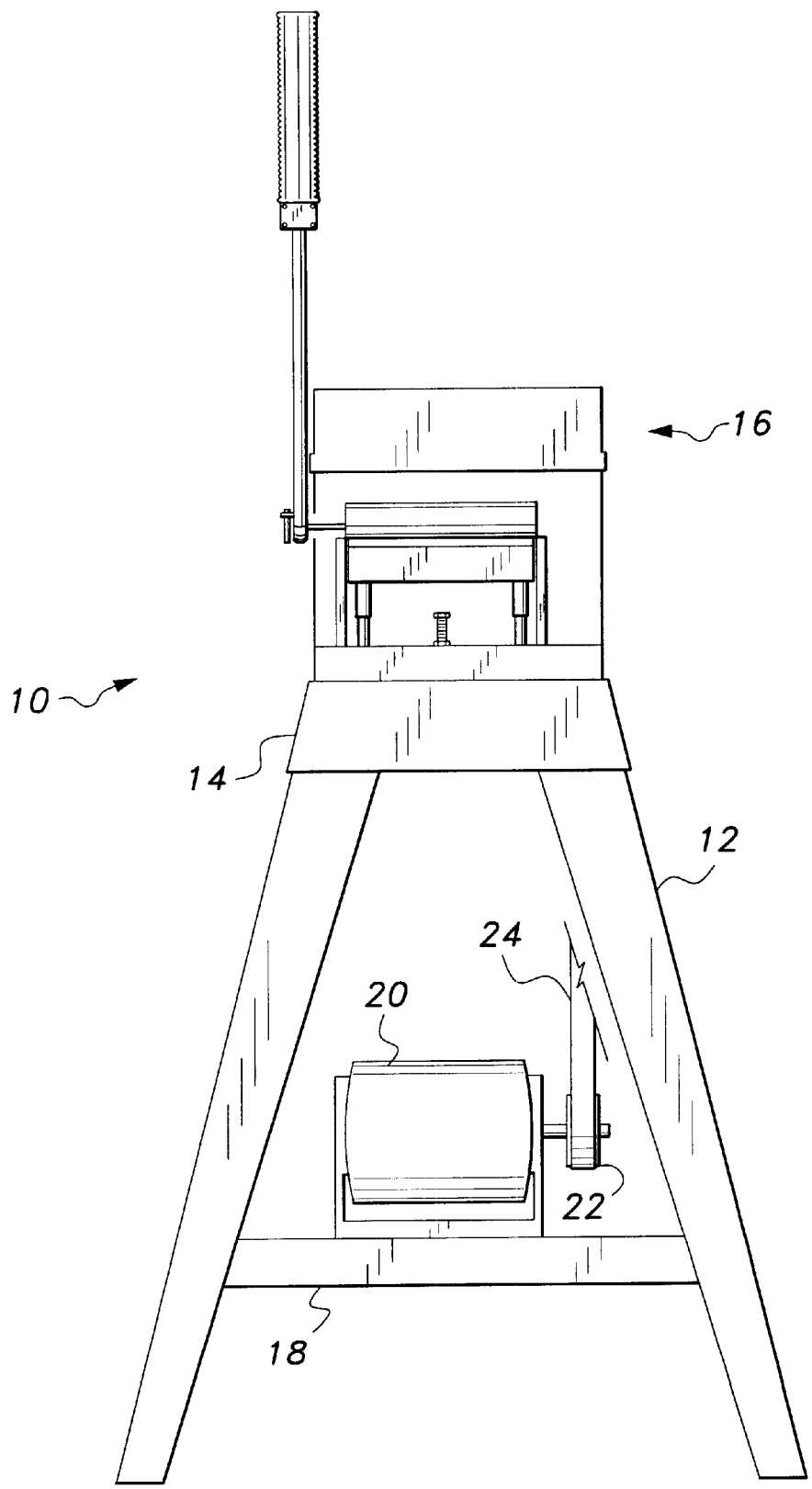
FIG. 1 is a front view of a carpentry coping machine according to the present invention.

Attention is directed to FIG. 1 which shows the present invention generally indicated at 10. A frame, comprising leg members 12 and support platform 14, is provided to support a coping machine generally indicated at 16. A framework 18 is attached to leg members 12 in a conventional manner to support a three-quarter horsepower motor 20 thereon. A pulley 22 is rotatatably secured to motor 20. Drive belt 24 is mounted on pulley 22 and extends upwardly therefrom to the coping machine as will be explained below.

Figure 2:
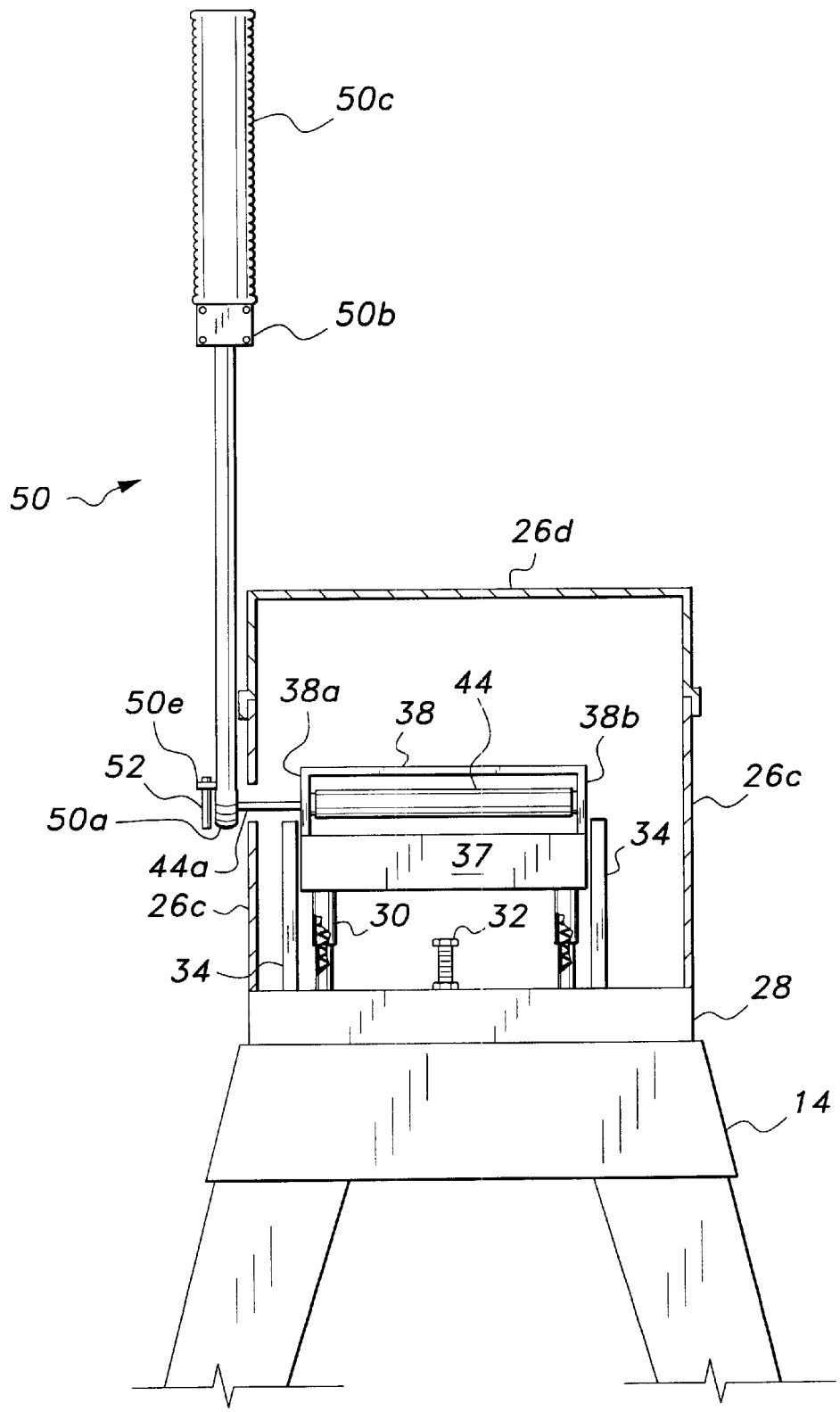
FIG. 2 is a partially cut-away front view of a carpentry coping machine according to the present invention.
Figure 3:
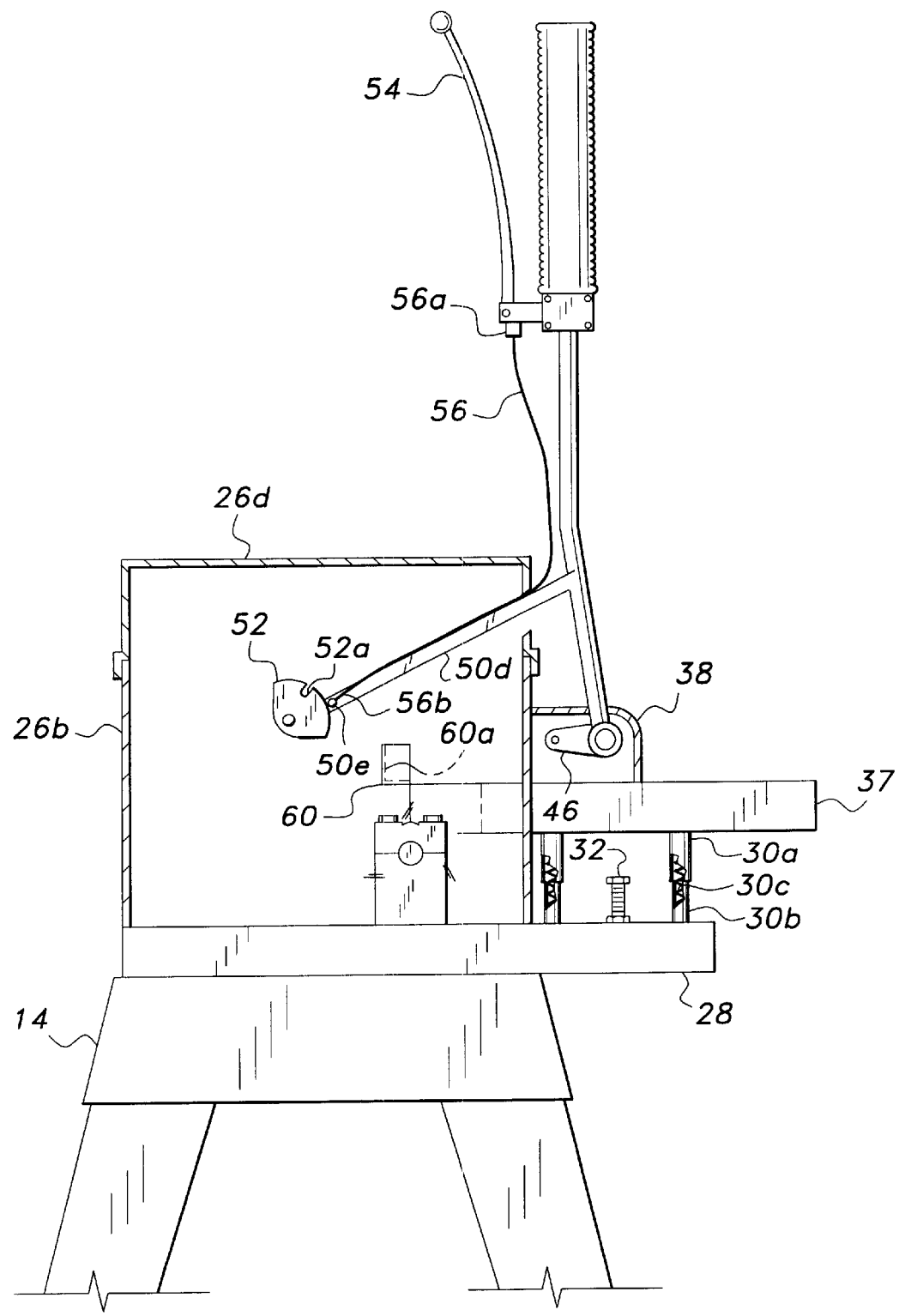
FIG. 3 is a partially cut-away side view of a carpentry coping machine according to the present invention.
Figure 4:
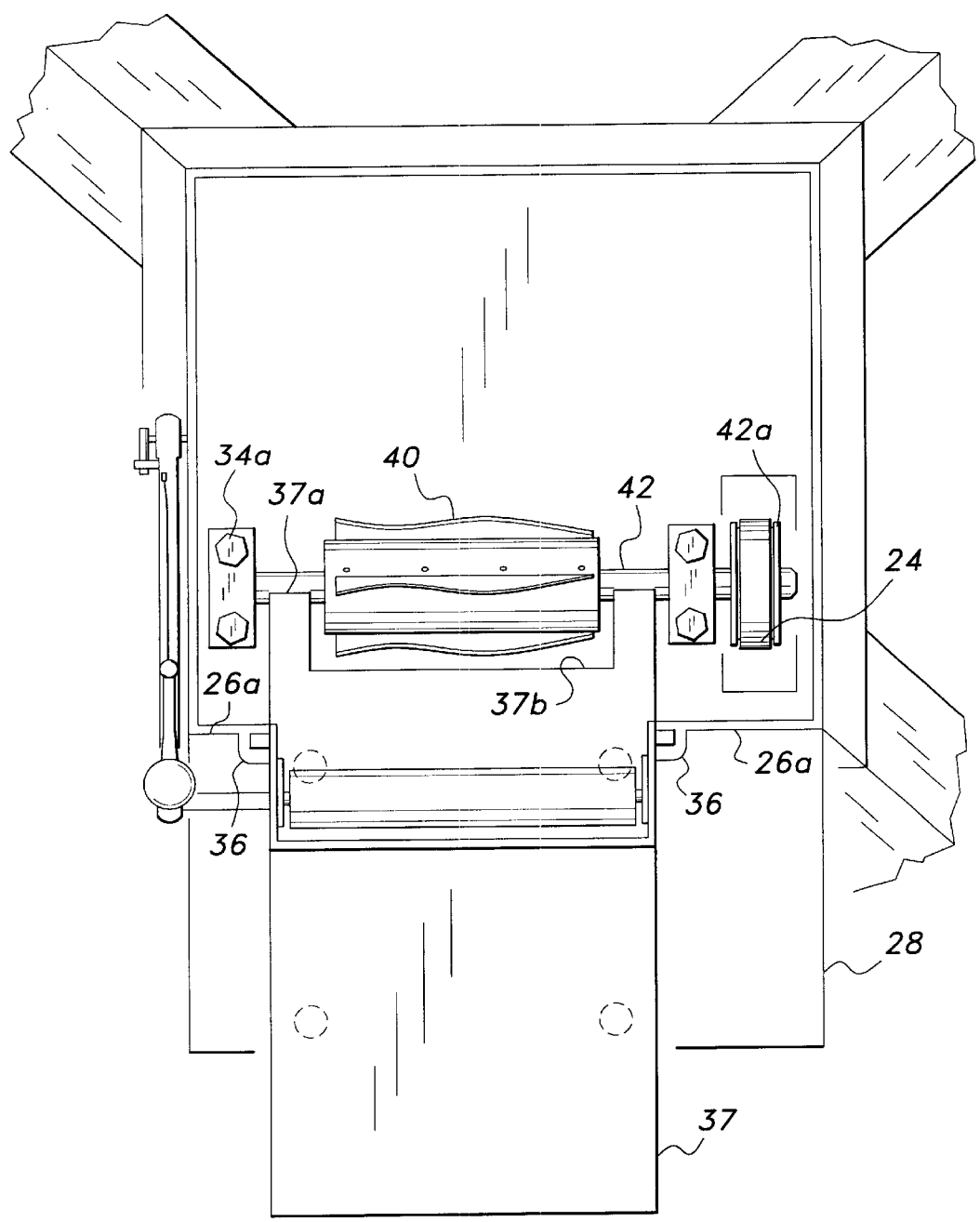
FIG. 4 is a partially cut-away top view of a carpentry coping machine according to the present invention.

As best seen in FIGS. 2–4, coping machine 16 comprises a housing assembly having a partially open front wall 26a, a rear wall 26b, side walls 26c, and removable top 26d. The housing assemble sits atop a base plate 28, which base plate is removably disposed on support platform 14. Base plate 28 extends horizontally from rear wall 26b to a position exterior of the housing assembly. Secured rigidly to the top surface of base plate 28 are four spring assembly members 30, an adjustable stop 32, and two spaced, bearing members 34. The bearing members 34 are positioned within the housing assembly and may be easily disassembled by removing bolts 34a. L-shaped vertical guides 36, whose purpose will be later explained, extend along either side of the opening formed in front wall 26a.

Spring assembly members 30 consist of telescoping tubular parts 30a and 30b. A helical spring 30c is disposed in each member 30. A horizontally positioned work platform 37 is spaced above base plate 28. Work platform 37 is rigidly secured to the upper ends of tubular parts 30a and has a rear end 37a terminating between spaced bearing assembly members 34. Springs 30c function to bias work platform 37 in a vertically upward direction relative to the top surface of base plate 28. Work platform 37 is formed with a cut-out portion 37b for accommodating the blades of a rotating knife 40. Knife 40 is disposed on an axle 42 which has its respective ends journaled in bearing members 34. Pulley 42a is attached to one end of axle 42 and is adapted to receive drive belt 24 thereon.

A shroud 38 having end walls 38a, 38b is attached to front wall 26a at the top of the opening therein. A locking roller 44 is housed in shroud 38 and is provided with an axle 44a. One end of axle 44a is attached to a plate 46. Plate 46 is pivotally mounted on end wall 38b. The other end of axle 44a extends through shroud end wall 38a, housing assembly side wall 26c and is fastened in the lower end 50a of handle 50.

Handle 50 is positioned outside the housing assembly and extends upwardly adjacent sidewall 26c from lower end 50a to upper end 50b. Upper end 50b is fitted with a gripping surface 50c. As best seen in FIG. 3, a segment 50d extends at an angle from handle 50 and terminates adjacent a locking plate 52, which plate 52 is rigidly attached to the outer surface of sidewall 26c. Plate 52 is provided with an arcuate surface and has a notch 52a formed therein. A locking dowel 50e is disposed on the end of segment 50d. When inserted in notch 52a, locking dowel 50e functions to prevent handle 50 from moving. A release handle 54 is pivotally mounted on handle 50. Release cable 56 is fastened at one end 56a to release handle 54. A second end 56b is attached to locking dowel 50e. Pivoting release handle 54 will cause release cable 56 to unseat locking dowel 50e from notch 52a thereby allowing handle 50 to be rotated in a direction away from the housing assembly. In turn, rotation of handle 50 will cause downward movement of locking roller 44 toward work platform 37.

A back fence 60 (best seen in FIG. 3) is positioned adjacent the top rear edge of work platform 37. Back fence 60 is an L-shaped member which extends across the entire width (sidewall to sidewall) of the housing. A neoprene material 60a (shown in dotted lines) is inserted in back fence 60 for purposes which will be subsequently described.

Figure 7:
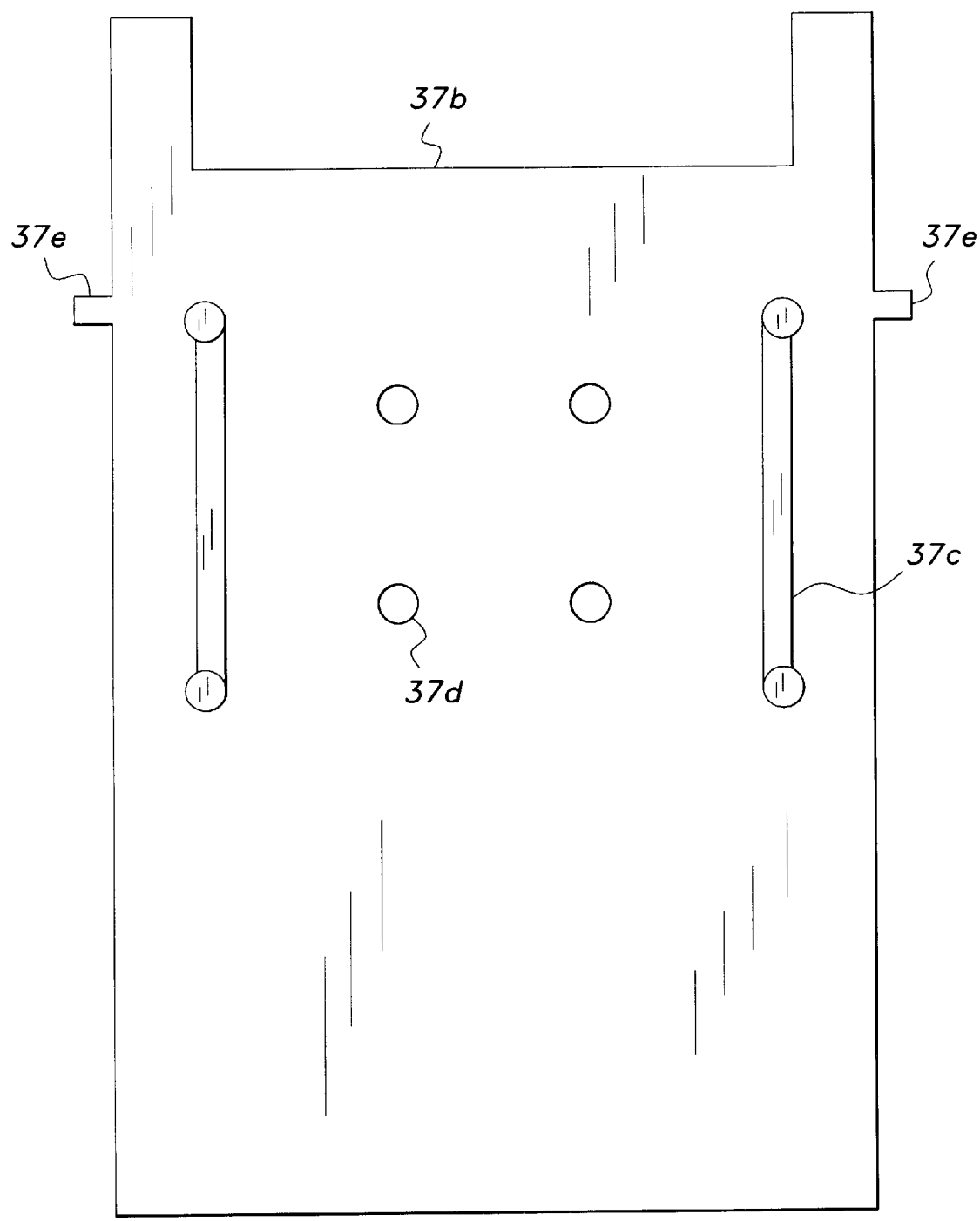
FIG. 7 is a detailed top view of a work platform of a carpentry coping machine according to the present invention.

FIG. 7 shows a plan view of the work platform 37. As indicated above, work platform 37 is formed with a cut-out portion 37b to accommodate knife roller 40. U-shaped side fences 37c are positioned to provide guides for the baseboard or crown molding stock. Plural openings 37d are formed in work platform 37 so that the side fences may be adjusted as is conventional in the art. Vertical guide tabs 37e are formed on each side of platform 37. Guide tabs 37e are positioned within vertical guides 36 to stabilize movement of platform 37.

Figure 5:
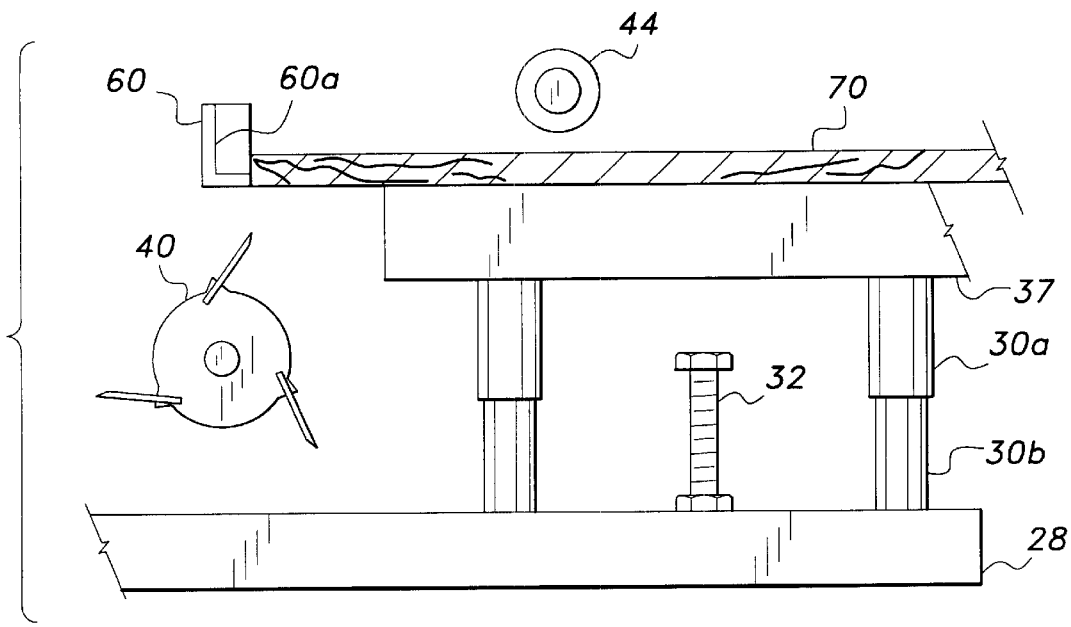
FIG. 5 is a partial, environmental view of a carpentry coping machine in a released position according to the present invention.
Figure 6:
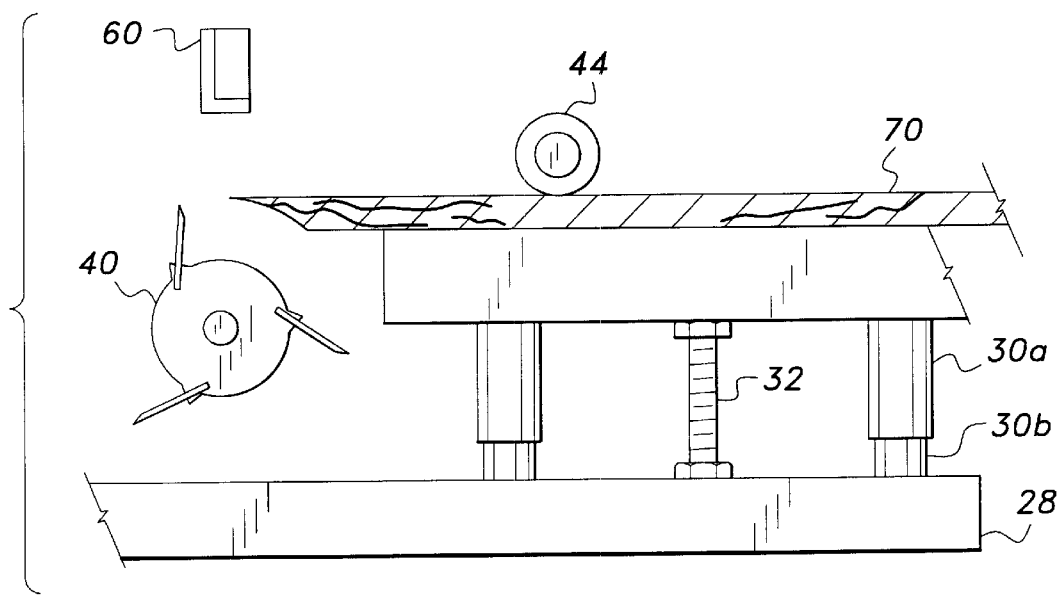
FIG. 6 is a partial, environmental view of a carpentry coping machine in an engaged position according to the present invention.

To operate the device, motor 20 is activated to cause drive belt 24 to rotate knife roller 40. A piece of baseboard or crown molding stock 70 is positioned on work platform 37 and pushed into the housing assembly until it abuts back fence 60 (FIG. 5). The side fences 37c will act as guide surfaces for the stock 70. Neoprene insert 60a will function to provide a cushioning and protective surface. After the stock 70 is positioned, release handle 54 is pivoted to unseat locking dowel 50e from notch 52a thereby unlocking handle 50. Forward movement of handle 50 will act to move locking roller 44 into contact with stock 70. Continued forward movement of handle 50 will force platform 37 downward against adjustable stop 32. At this position knife 40 will perform a miter cut on stock 70 (FIG. 6). Springs 30c will cause platform 37 to return to its original position when handle 50 is released. As indicated above, guide tabs 37e and vertical guides 36 will stabilize platform movement so that an accurate cut is performed in approximately five seconds.

It is to be understood that the present invention is not limited to the sole embodiment described above, but encompasses any and all embodiments within the scope of the following claims.

I claim:

1. A portable coping machine comprising:
    a plurality of leg members, said leg members having upper ends and lower ends;
    a support platform positioned on said upper ends of said leg members;
    a base plate having a horizontal, planar surface, said base plate being supported on said support platform;
    a work platform having a horizontal planar work supporting surface, said work platform having a rear edge;
    a rotary cutting knife positioned adjacent said rear edge;
    first means for supporting said work platform above said base plate, said first means allowing said work platform to move toward and away from said base plate; and
    second means for initiating movement of said work platform toward said base plate.

2. The portable coping machine as defined in claim 1, wherein said first means include plural, spring-biased telescoping members each member having an upper end rigidly attached to said work platform and a lower end rigidly attached to said base plate.

3. The portable coping machine as defined in claim 2, wherein said second means include a lock roller positioned above and out of contact with the work supporting surface of said work platform;
    a movable handle, said lock roller connected to said movable handle, whereby said lock roller may be moved into contact with said work supporting surface.

4. The portable coping machine as defined in claim 3, including third means for locking said handle and said lock roller when said lock roller is positioned above and out of contact with said work supporting surface.

5. The portable coping machine as defined in claim 4, including fourth means for rotating said rotary cutting knife.

6. The portable coping machine as defined in claim 5, wherein said fourth means comprise an electrical motor and a pulley system.

7. The portable coping machine as defined in claim 6, including a framework supported by said leg members, said framework disposed between said upper ends and said lower ends of said leg members, said electrical motor being supported on said frame work.

8. The portable coping machine as defined in claim 7, including an adjustable stop, said adjustable stop attached to said base plate and space from said work platform.

9. The portable coping machine as defined in claim 8, wherein said adjustable stop is movable in a vertical direction toward and away from said work platform.

10. A portable coping machine comprising:
    a plurality of leg members, said leg members having upper ends and lower ends;
    a support platform positioned on said upper ends of said leg members;
    a base plate having a horizontal, planar surface, said base plate being supported on said support platform;
    a work platform having a horizontal planar work supporting surface, said work platform having a rear edge;
    a rotary cutting knife positioned adjacent said rear edge;
    first means for supporting said work platform above said base plate, said first means allowing said work platform to move toward and away from said base plate;

second means for initiating movement of said work platform toward said base plate;

a housing, said housing disposed on said base plate and enclosing said rear edge of said work supporting surface.

11. The portable coping machine as defined in claim 10, wherein said housing comprises a rear wall, two side walls, a top wall and a partially open front wall.

12. The portable coping machine as defined in claim 11, including a fence member, said fence member positioned adjacent said rear edge of said work platform.

13. The portable coping machine as defined in claim 12, wherein said fence member is of an L-shaped configuration.

14. The portable coping machine as defined in claim 13, wherein said fence member is lined with neoprene.

15. The portable coping machine as defined in claim 14, wherein said first means include plural, spring-biased telescoping members each member having an upper end rigidly attached to said work platform and a lower end rigidly attached to said base plate.

16. The portable coping machine as defined in claim 15, wherein said second means include a lock roller positioned above and out of contact with said work supporting surface of said work platform;

a movable handle, said lock roller connected to said movable handle whereby said lock roller may be moved into contact with said work supporting surface.

17. The portable coping machine as defined in claim 16, including a shroud disposed on said front wall of said housing adjacent said partial opening.

18. The portable coping machine as defined in claim 17, wherein said lock roller is positioned within said shroud.

19. The portable coping machine as defined in claim 18, including third means for rotating said rotary cutting knife, said third means comprising an electric motor and a pulley system.

20. The portable coping machine as defined in claim 19, including an adjustable stop, said adjustable stop attached to said base plate and spaced from said work platform, said adjustable stop being movable in a vertical direction toward and away from said work platform.

\* \* \* \* \*